United States Patent [19]

Gatzki

[11] 4,286,484
[45] Sep. 1, 1981

[54] MACHINE TOOL

[75] Inventor: Helmut H. Gatzki, Esslingen, Fed. Rep. of Germany

[73] Assignee: Index-Werke KG Hahn & Tessky, Esslingen, Fed. Rep. of Germany

[21] Appl. No.: 82,309

[22] Filed: Oct. 5, 1979

[30] Foreign Application Priority Data

Oct. 11, 1978 [DE] Fed. Rep. of Germany ....... 2844247

[51] Int. Cl.³ .............................................. B23B 17/00
[52] U.S. Cl. ....................................................... 82/32
[58] Field of Search ................................... 82/32, 2 R

[56] References Cited

U.S. PATENT DOCUMENTS

| | | | |
|---|---|---|---|
| 1,328,962 | 1/1920 | Overgaard | 82/32 |
| 2,014,667 | 9/1935 | Potter | 82/32 |
| 2,679,780 | 6/1954 | Bauersachs | 82/32 |
| 3,124,985 | 3/1964 | Curtis et al. | 82/32 |
| 3,186,267 | 6/1965 | Pabst et al. | 82/32 |

*Primary Examiner*—Leonidas Vlachos
*Attorney, Agent, or Firm*—Shenier & O'Connor

[57] ABSTRACT

A machine tool, particularly a lathe, has three longitudinally extending, laterally spaced guides mounted on a frame to extend substantially parallel to one another. Two carriages are slidably mounted on the guides for movement therealong, the two carriages being movable in parallel directions. Each of the carriages is mounted on a respective one of the outer guides and on the central guide. The central guide is provided with guide faces arranged to provide complete guidance of each carriage in the two directions orthogonal to the longitudinal extent of the guide, that it, both laterally and vertically.

5 Claims, 5 Drawing Figures

MACHINE TOOL

BACKGROUND OF THE INVENTION

The present invention relates to machine tools, and particularly to lathes.

A lathe is known in which three longitudinally extending, laterally spaced guides are mounted on a frame to extend substantially parallel to one another. Two carriages are slidably mounted on the guides for movement therealong, the two carriages being movable in parallel directions. Each of the carriages is mounted on a respective one of the outer guides and on the central guide.

In this known lathe, the central guide and the two outer guides are formed by broad hardened steel bars mounted on an under-frame which is a casting. Each of the two carriages is supported on one of the outer guides, and both carriages are supported conjointly on the central guide.

Each carriage is guided laterally by the engagement of a lower carriage segment between the respective outer guide and the central guide, this carriage segment resting without play, on the facing longitudinal sides of the said guides, which sides are spaced from one another. As a result, it is not possible to shift the carriage on the guides transversely to the carriage adjustment direction and transversely to the guide members.

Each carriage is guided vertically by way of counter-strips, located on the underside of the carriage, which rest on lower support faces on the corresponding guides. This prevents the carriages lifting off the guides.

Accordingly, both the guides which guide each carriage are involved in the lateral guiding and in the vertical guiding of the carriage, that is all three guides are involved in the guiding of both carriages. This makes it necessary that the three guides are all precisely parallel to one another in order to ensure that the carriages can move parallel to one another. This can only be achieved at considerable manufacturing expense.

It is an object of the present invention to provide a machine tool, such as a lathe, having the features described at the outset, in which for lateral guiding of the carriages precise parallel alignment of the guides relative to one another is no longer necessary.

SUMMARY OF THE INVENTION

According to the present invention there is provided a machine tool comprising a frame, first and second longitudinally extending guides supported on said frame and laterally spaced from one another, a central longitudinally extending guide supported on said frame between said first and second guides and laterally spaced from each of said first and second guides, a first carriage slidable mounted on said first and central guides for movement therealong, and a second carriage slidably mounted on said second and central guides for movement therealong parallel to the direction of movement of said first carriage, said guides having guide faces arranged such that each said carriage is guided both laterally and vertically, wherein the central guide has a first segment on one side thereof, the first segment carrying guide faces arranged to provide complete guidance of the first carriage laterally and vertically, and the central guide has a second segment on the other side thereof, the second segment carrying guide faces arranged to provide complete guidance of the second carriage laterally and vertically.

The present invention recognizes that the guide faces for the vertical guiding and lateral guiding of the carriages should be provided on the shared guide, so that the outer guides are only required for the vertical guiding. Thus, parallel alignment of these outer guides on the frame is not necessary.

The guide faces on the central guide, which faces provide the lateral guiding and the vertical guiding, can be produced simply and rapidly, with high precision, by grinding, and the time required to fit this central guide and the two outer guides on the frame can be restricted to a minimum.

A further advantage of the invention is that a guide channel, such as remains between the guides in the conventional construction, is not present between the guide faces which provide the lateral guiding for the two carriages. Accordingly, there are no longer any interspaces between the two outer guides and the central guide into which turnings might fall in the region between the machine carriages. Consequently, the provision of gravity chutes, and the covering of two adjacent longitudinal guide surfaces of the central guide is no longer necessary.

If the guides are in the horizontal plane, a stripper, actuated by one of the machine carriages, suffices to keep the guide faces free from turnings. On the other hand, in the case of an under-frame which forms an inclined bed, the fact that the central guide is equipped with all the guide faces required for vertical guiding and lateral guiding ensures that the turnings automatically drop off the under-frame. Accordingly, it is possible to dispense with a cover, at least at the lower end of the two adjacent outer guides.

The invention offers a further advantage in as much as very narrow guide prisms can be formed, at a relatively small distance from one another on the central guide, to provide the lateral and vertical guiding of the carriage, and the central guide can be located on the under-frame in such a way that the guide faces of the said guide are in the immediate vicinity of the axis of the work spindle.

Finally, an important advantage of the invention is that the central guide can be made of such size that it is in itself able to absorb substantial transverse forces. If therefore, for example, there should be at some time a collision between the two carriages, this will hardly have an adverse effect on their lateral guiding.

BRIEF DESCRIPTION OF THE DRAWINGS

Embodiments of the present invention will hereinafter be described, by way of example, with reference to the accompanying drawings, in which.

DESCRIPTION OF A PREFERRED EMBODIMENT

Figure 1:
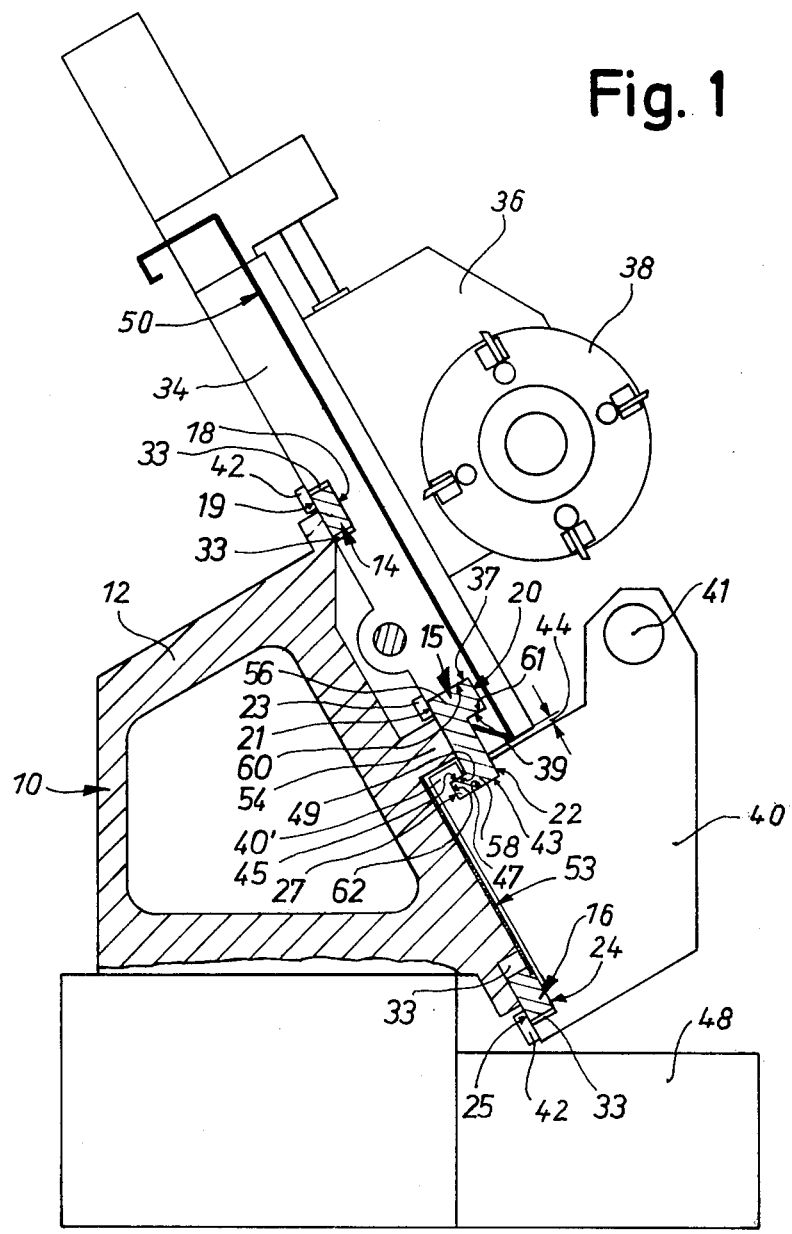
FIG. 1 shows a cross-section of an angle-bed lathe, the sub-frame of which carries a first embodiment of a guide arrangement for guiding two carriages.

FIG. 1 shows an angled-bed lathe having a sub-frame formed of a casting. Three longitudinally extending guides 14, 15 and 16 are arranged above one another on an upper part 12 of the sub-frame 10 and extend substantially parallel to one another. These guides 14, 15 and 16 have longitudinally extending guide surfaces for guiding two carriages 34 and 40. The carriages 34 and 40 being slidably mounted on respective guides for movement therealong, the two carriages being movable in directions parallel to each other.

The guides consist of hardened and ground steel strips which are detachably mounted on longitudinally extending holding bars of the sub-frame 10.

The central guide 15 serves to guide both the carriages 34 and 40. In the embodiment illustrated, the carriage 40 carries a lathe centre 41 or a tailstock sleeve, and the carriage 34, which is a longitudinal carriage, carries a transverse carriage 36, for example a revolver carriage (the revolver head of which is marked 38), which is adjustable at right angles to the direction of travel of the carriage 34.

For the purpose of guiding the carriage 34, the upper and central guides 14 and 15 have upper plane guide faces 18 and 20 respectively.

The upper guide face 18 is arranged to extend parallel to an associated contact face 19 which is provided on the underside of the upper guide 14.

The upper guide face 20 is arranged to extend parallel to a contact face 21 which is provided on the underside of the central guide 15.

Two counter-strips 42 and 23 are fixed on the underside of the carriage 34, and each abuts a respective one of the contact faces 19 and 21.

The faces 18, 19 of the upper guide 14 and the faces 20, 21 of the central guide 15 form the guide faces required for the vertical guiding of the carriage 34.

For guiding the carriage 40, the lower guide 16 and the central guide 15 have upper plane guide faces 24 and 22 respectively.

The upper guide face 24 is arranged to extend parallel to an associated contact face 25 which is provided on the underside of the lower guide 16.

The upper guide face 22 is arranged to extend parallel to a contact face 27 which is provided on the underside of the central guide 15.

A counter-strip 42 fixed to the carriage 40 rests against the contact face 25 of the lower guide 16. To make contact with the contact face 27, the carriage 40 has a segment 40' which positively engages around a lateral segment 58 of the central guide 15, the lateral segment 58 carrying the faces 22 and 27 of the central guide 15.

Similarly, the guide 15 has a lateral segment 56 carrying the faces 20 and 21.

It will thus be seen that the central guide 15 is in the form of a steel strip having a Z-shaped cross-section, the lateral segments 56 and 58 forming the arms of the Z-shaped cross-section. The central guide 15 is mounted on a holder bar 54, which forms part of the sub-frame 10, such that they project laterally beyond the holder bar. The segments 56, 58 engage positively in corresponding grooves provided in the two carriages 34, 40.

For lateral guiding of the carriage 34, the segment 56 of the central guide 15 has two plane guide faces 37 and 39 which are spaced from and extend parallel to, one another. These faces 37 and 39 extend at right angles to the guide and contact faces 20 and 21 provided on the segment 56, and rest against corresponding counter-faces 60 and 61 of the carriage 34.

The counter-faces 60 and 61 form the side walls of the groove machined in the carriage 34, in which the segment 56 of the central guide 15 engages positively.

The guide faces 37 and 39 in co-operation with the counter-faces 60, 61 secure the carriage 34 in the lateral direction, that is they provide the lateral guiding of this carriage.

For the lateral guiding of the carriage 40, the segment 58 of the central guide 15 has two plane guide faces 43 and 45 spaced from, and extending parallel to, one another. The faces 43 and 45 extend at right angles to the guide and contact faces 22 and 27, and rest against corresponding counter-faces 47 and 49 of the segment 40' of the carriage 40.

The guide faces 43 and 45 in co-operation with the counter-faces 47 and 49, secure the carriage 40 in the lateral direction, that is they provide the lateral guiding of this carriage.

The central guide 15 thus possesses all the guide faces necessary for the complete guiding of each carriage in the two directions orthogonal to the longitudinal extent of the guide, that is, both vertically and laterally. This, inter alia, has the advantage that the outer guides 14, 16 which are provided solely for vertical guiding of the carriages, need not extend exactly parallel with respect to the central guide 15. Hence, gaps 33 can be left between the longitudinal lateral faces of the outer guides and the adjacent carriage faces.

The provision of a single Z-shaped guide 15 carrying both guide faces 20, 22 for the vertical guiding of the carriages has the advantage that the gap between the two guide faces 20 and 22 is bridged by the guide itself and hence there is no longer a possibility that turnings can fall into an interspace present between the two guide faces. This means that it is possible to dispense with the provision of one or more gravity chutes in the sub-frame and hence the sub-frame can be manufactured substantially more cheaply than previously.

The arrangement shown in FIG. 1 also makes it possible to provide a cover 50 which covers the guide face 20, and which may also bridge at least a substantial part of a gap 44 present between the two carriages 34 and 40.

In the embodiment of FIG. 1, the lower guide 16 is in a plane displaced from the plane in which the other two guides 14 and 15 are located. This ensures that turnings which reach the central guide 15 automatically slip off the latter, so that it is no longer necessary to cover the lower guide 16.

A futher cover 53 is provided below the central guide 15 on the sub-frame 10; the top surface of this cover 53 forms a guide surface for turnings, by means of which the turnings are led away over the top of the lower guide 16.

Figure 2:
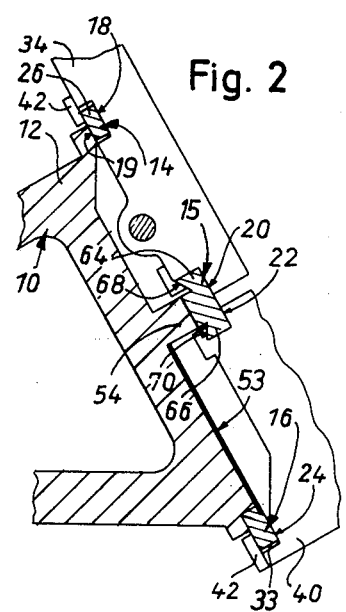
FIGS. 2 to 5 show further embodiments of guide arrangements for two carriages movable parallel to one another on the sub-frame of a lathe.
Figure 3:
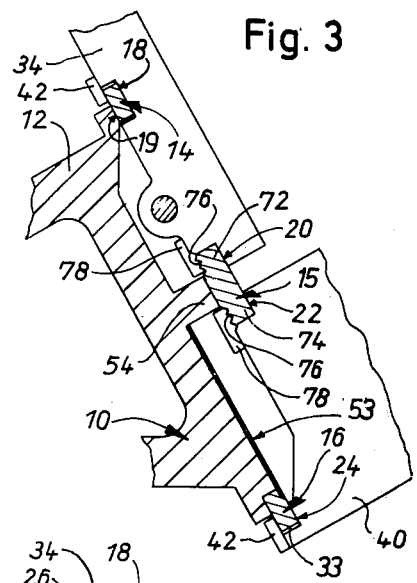
Figure 4:
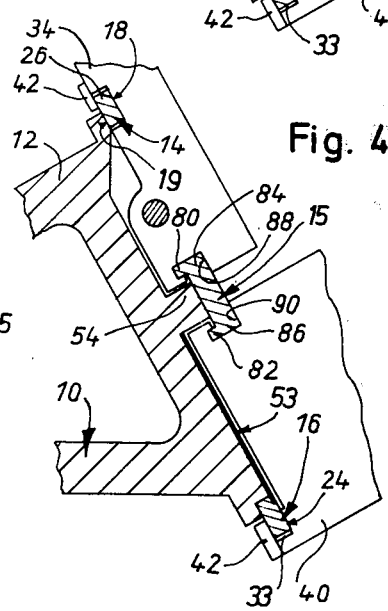

In the embodiments of the invention illustrated in FIGS. 2 to 4 adjacent guide faces 20 and 22 are again provided on the central guide 15, which is detachably mounted on the holder bar 54. The guide 15 and the bar 54 together forming a guide cheek having a substantially T-shaped cross-section.

In the embodiment of FIG. 2, the segments of the guide 15 which project beyond the holder bar 54 are referenced 64 and 66 and carry the guide faces 20 and 22 respectively. On its lower face, each segment 64, 66 has a plane slide face 68, 70 respectively which frictionally co-operates with a counter-face of the associated carriage 34 or 40.

These slide faces 68 and 70 each extend at an acute angle relative to a side face of the holder bar 54. Furthermore, the carriages 34 and 40 each positively engage around the corresponding strip segment 64, 66 of the guide 15.

In the embodiment illustrated in FIG. 3, the segments of the guide 15 which project laterally beyond the holder bar 54 are referenced 72 and 74. These strip segments possess, on their underside, a plurality of longitudinally extending grooves 76 which are, for example, of V-shaped cross-section. Counter-strips having corresponding profiles are fitted to the underside of the carriages 34, 40 and positively engage in the said grooves.

In FIG. 4, the guide 15 fitted to the holder bar 54 is of U-shaped cross-section having two arms 80 and 82 each extending laterally beyond the holder bar 54 and spaced therefrom. The segments 84, 86 which laterally project beyond the holder bar each positively engage in a respective groove 88, 90 of the corresponding carriage 34 or 40.

Figure 5:
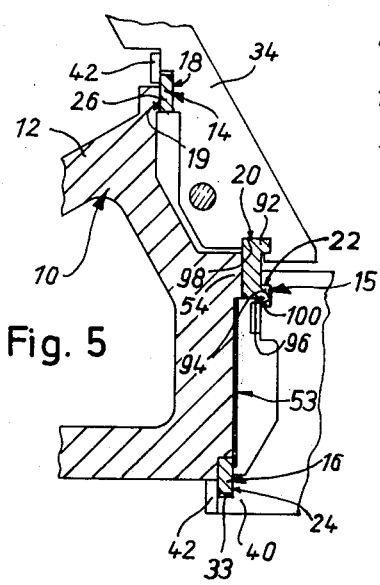

In the case of the arrangement shown in FIG. 5, the outer guides 14, 16 are each arranged on the sub-frame 10 in a vertical plane. In this construction, again, the central guide 15 having the two adjacent guide faces 20 and 22 is mounted on a holder bar 54.

The guide 15 has a U-shaped cross-section and is arranged on the holder bar such that its arms 92 and 94 face away from the holder bar 54. Furthermore, an arm 96 extends downwardly from the lower arm 94 to define an angular cross-section. The arms 92 and 94 each positively engage in a respective guide groove 98, 100 in the corresponding carriage 34 or 40.

Analogously to the embodiment shown in FIG. 1, the interspace present between the two adjacent guide faces 20 and 22 on the central guide 15 is thereby bridged over.

I claim:

1. A machine tool comprising a frame, first and second longitudinally extending guides supported on said frame and laterally spaced from one another, a central longitudinally extending guide supported on said frame between said first and second guides and laterally spaced from each of said first and second guides, a first carriage slidably mounted on said first and central guides for movement therealong, and a second carriage slidably mounted on said second and central guides for movement therealong parallel to the direction of movement of said first carriage, said guides having guide faces arranged such that each said carriage is guided both laterally and vertically, wherein the central guide has a first segment on one side thereof, the first segment carrying guide faces arranged to provide complete guidance of the first carriage laterally and vertically, and the central guide has a second segment on the other side thereof, the second segment carrying guide faces arranged to provide complete guidance of the second carriage laterally and vertically, a longitudinally extending holder bar formed on said frame, the central guide being mounted on said holder bar such that said first segment projects laterally of one side of the holder bar and said second segment projects laterally of the other side of the holder bar, each of said central guide segments comprising a salient rail extending in the direction of the length of said central guide for providing said complete guidance of the respective carriages.

2. A machine tool according to claim 1, wherein the central guide has a Z-shaped cross-section providing said rails.

3. A machine tool according to claim 1, wherein the central guide has a U-shaped cross-section having two spaced arms, each arm being spaced laterally from the holder bar and facing toward the holder bar whereby each arm forms one of said salient rails, and wherein each said rail is in positive engagement in a groove provided in the corresponding one of the carriages, each rail being located in the corresponding groove such that all the longitudinally extending faces of the rail are in contact with the surface of the groove whereby the corresponding carriage is guided both laterally and vertically.

4. A machine tool according to claim 1, wherein the central guide has a U-shaped cross-section having two spaced arms, each arm being spaced laterally of said holder bar and facing away from the holder bar whereby each arm forms one of said salient rails, and wherein each said rail is in positive engagement in a groove provided in the corresponding one of the carriages, each rail being located in the corresponding groove such that all the longitudinally extending faces of the rail are in contact with the surface of the groove whereby the corresponding carriage is guided both laterally and vertically.

5. A machine tool according to claim 4, wherein a further arm extends outwardly from at least one of said arms to define an angular cross-section.

* * * * *